(12) United States Patent
Watts et al.

(10) Patent No.: US 10,272,970 B2
(45) Date of Patent: Apr. 30, 2019

(54) SYSTEM FOR AUTOMATICALLY MODIFYING THE LEAN OF A CATAMARAN DURING A TURN

(71) Applicants: Charles E Watts, Emerald Isle, NC (US); Barry LeRay, Wilmington, NC (US); Adrian Ronald Sanderson, Raleigh, NC (US)

(72) Inventors: Charles E Watts, Emerald Isle, NC (US); Barry LeRay, Wilmington, NC (US); Adrian Ronald Sanderson, Raleigh, NC (US)

( * ) Notice: Subject to any disclaimer, the term of this patent is extended or adjusted under 35 U.S.C. 154(b) by 0 days.

(21) Appl. No.: 14/991,676

(22) Filed: Jan. 8, 2016

(65) Prior Publication Data

US 2016/0200414 A1    Jul. 14, 2016

Related U.S. Application Data

(60) Provisional application No. 62/100,964, filed on Jan. 8, 2015.

(51) Int. Cl.
| | |
|---|---|
| *B63B 1/12* | (2006.01) |
| *B63B 1/32* | (2006.01) |
| *B63B 39/06* | (2006.01) |
| *B63H 20/12* | (2006.01) |

(52) U.S. Cl.
CPC .............. *B63B 1/121* (2013.01); *B63B 39/06* (2013.01); *B63B 39/061* (2013.01); *B63B 2001/325* (2013.01); *B63H 20/12* (2013.01); *Y02T 70/12* (2013.01)

(58) Field of Classification Search
CPC .. B63B 1/10; B63B 1/12; B63B 1/121; B63B 1/14; B63B 2001/203; B63B 2001/204; B63B 2001/205; B63B 2001/206; B63B 2001/207; B63B 1/24; B63B 1/248; B63B 1/26; B63B 1/28; B63B 2001/281; B63B 1/283; B63B 1/285; B63B 1/286; B63B 1/30; B63B 2001/325; B63B 39/06; B63B 39/061; B63B 39/062; B63B 39/065; B63B 39/067; B63B 39/068; B63H 20/12
USPC ...... 114/61.1–61.25, 145 R, 145 A, 283–287
See application file for complete search history.

(56) References Cited

U.S. PATENT DOCUMENTS

| | | | | |
|---|---|---|---|---|
| 3,307,511 | A | * | 3/1967 | Chapman .................. B63B 1/12 114/61.21 |
| 3,584,590 | A | * | 6/1971 | Rings ........................ B63B 1/22 114/286 |
| 3,604,384 | A | * | 9/1971 | Coles ...................... B63L 31/24 114/274 |

(Continued)

FOREIGN PATENT DOCUMENTS

JP         03082697 A  *  4/1991

*Primary Examiner* — Ajay Vasudeva
(74) *Attorney, Agent, or Firm* — Carla Gannon Law

(57) ABSTRACT

A system for automatically modifying the lean of a catamaran during a turn includes a pair of fins, each substantially permanently affixed to the inside edge of the left and right hull, plus a pair of vertically displacing plates that extend, one at a time, from the left or right hull, into the body of water. Individually, the fins or plates modify the lean of a catamaran during a turn such that the tilt is neutral or inboard, versus outboard without either. The cumulative effect of using both is substantial and synergistic.

8 Claims, 16 Drawing Sheets

(56) References Cited

U.S. PATENT DOCUMENTS

| | | | | |
|---|---|---|---|---|
| 4,027,614 | A * | 6/1977 | Jones | B63B 1/283 |
| | | | | 114/163 |
| 4,606,291 | A * | 8/1986 | Hoppe | B63B 1/042 |
| | | | | 114/274 |
| 4,665,853 | A * | 5/1987 | Gerdsen | B63B 1/042 |
| | | | | 114/274 |
| 4,748,929 | A * | 6/1988 | Payne | B63L 31/24 |
| | | | | 114/280 |
| 4,802,428 | A * | 2/1989 | Lang | B63B 1/12 |
| | | | | 114/283 |
| 4,896,621 | A * | 1/1990 | Coles | B63L 31/248 |
| | | | | 114/274 |
| 6,006,689 | A * | 12/1999 | Olofsson | B63B 39/061 |
| | | | | 114/285 |
| 7,908,989 | B2 * | 3/2011 | McLoughlin | B63B 1/042 |
| | | | | 114/274 |
| 8,701,583 | B2 * | 4/2014 | Boschoff | B63B 1/20 |
| | | | | 114/274 |
| 8,955,451 | B2 * | 2/2015 | Daley | B63L 31/20 |
| | | | | 114/274 |

* cited by examiner

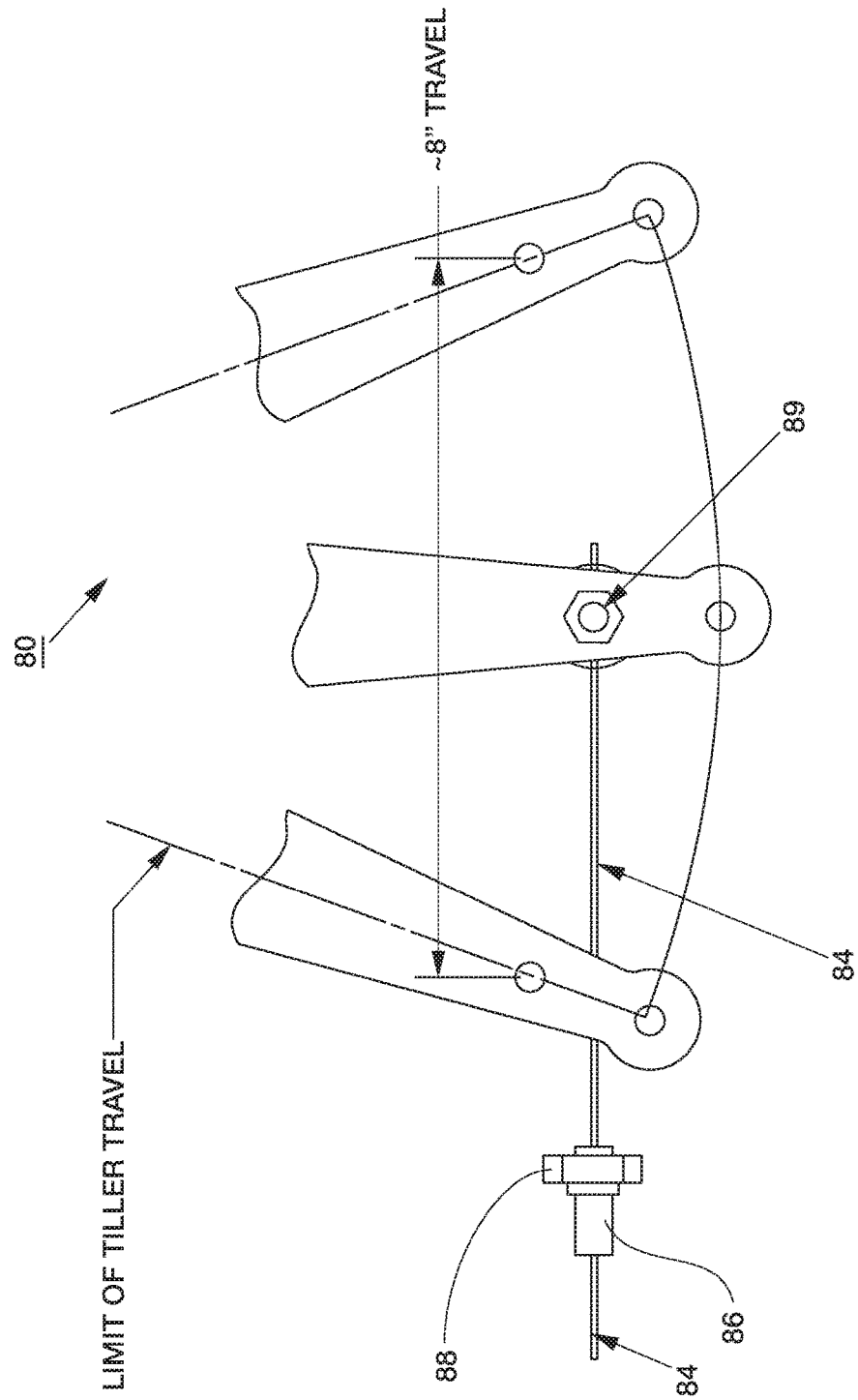

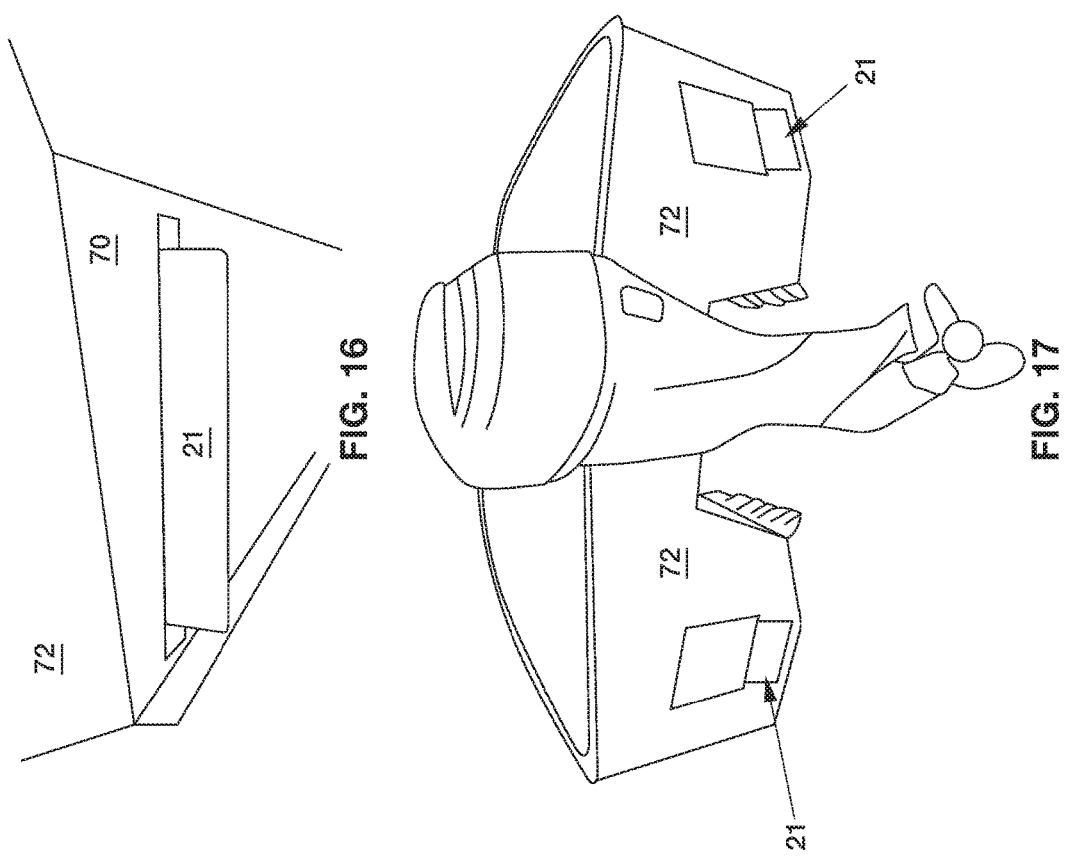

SYSTEM FOR AUTOMATICALLY MODIFYING THE LEAN OF A CATAMARAN DURING A TURN

CROSS-REFERENCE TO RELATED APPLICATIONS

This application claims the benefit of U.S. Provisional Patent Application No. 62/100,964, filed Jan. 8, 2015, entitled "SYSTEM FOR AUTOMATICALLY MODIFYING THE LEAN OF A CATAMARAN DURING A TURN". This Provisional Application is incorporated by reference in its entirety.

BACKGROUND OF THE INVENTION

The present invention relates to a system for integration in or attachment to a twin hull water vessel such as a catamaran to modify the lean of the catamaran during a turn, and more specifically, to a catamaran turning system including a set of fixed hull-mounted inwardly-directed fins, a set of vertically movable plates mounted on the stern end of the hull, and a steering-dependent control system for automatically raising and lowering the plates during operation of the catamaran.

Monohull boats, including V hull and skiffs, inherently tilt inwardly, or towards the vertex of the arc, during a turn. Said another way, the deck surface is lower on the inside side of the turn, and the boat pivots on the centerline of the hull along the arc of the turn. This provides a feeling of stability insofar as the passenger is pressed into the deck (or seat) of the boat during a turn. Without this tilting motion the centrifugal force of the turn would make the passenger feel as if they were being "thrown" from the boat during a turn, similar to the sensation of being in vehicle without a seatbelt when it takes a sharp turn at a moderate or higher speed.

In a catamaran however, there is no single pivot point along the centerline of the boat because there are two hulls, each having separate centerlines. This creates equal pressure against the two hulls in a turn, and a deck that either remains horizontal or tilts away from the vertex of the turning arc during a turn. This causes some passengers to feel as if they are on the verge of being thrown overboard. This is depicted in FIGS. 2 and 3.

This disconcerting centrifugal force is a common complaint of catamaran passengers, and is considered in the industry to be a major deterrent to catamaran ownership. Accordingly, there is a need for a system that facilitates passenger comfort during catamaran turns. It is desirable that this system facilitates comfort by negating some of the effects of centrifugal force during a turn by introducing a "banking" motion. It is desirable that this system functions automatically during normal operation of the catamaran. It is desirable that this system can be integrated into existing catamaran designs during the manufacturing process, or retrofitted with relative ease to already manufactured vessels.

SUMMARY OF THE INVENTION

The present invention generally pertains to devices for operating twin hull water vessels, and more specifically, to a system including a set of fixed hull-mounted inwardly-directed fins, and a set of vertically movable plates mounted on the stern end of the hull, that allow catamarans to make banking turns.

A system of the present invention can be conceptualized as having three main components: fixed fins, moveable plates, and a control system for the plates.

The fixed fins are a pair of rigid fins that are permanently or substantially permanently affixed to the left and right inside edge of the left and right vessel hull. These fins are generally oriented inwardly and towards each other. The fins provide drag during turns to minimize or eliminate offboard tilt.

The moveable plates are a pair of moveable plates, with one mounted to the left hull and one to the right hull. The plates move vertically. In the lowered position the plate is lower than the hull, in contact with the body of water, and provides drag during a turn. In the raised position the plate is flush with, or within the hull, not in substantial contact with the body of water, and doesn't affect turning dynamics. Each plate has its own displacement mechanism that lowers and raises the plate.

The control system for the plates includes a steering sensor that actuates the displacement mechanisms on the plates. More specifically, the steering sensor recognizes when the vessel operator is making a left turn and signals the displacement mechanism on the right to lower the right plate. When the vessel operator returns to a forward direction the steering sensor signals the displacement mechanism on the right to rise out of the body of water. When the vessel operator is making a right turn, the steering sensor signals the displacement mechanism on the left to lower the left plate. In this manner a maximum of one plate at a time is lowered and creating drag.

BRIEF DESCRIPTION OF THE DRAWINGS

FIG. 15 illustrates how the steering sensor ties into the catamaran's steering;

FIG. 16 illustrates plate extending downward from hull; and

FIG. 17 illustrates plate extending downward from transom.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:
- 10—Lean modification system;
- 15—Water vessel;
- 17—Steering apparatus;
- 20—Turning assembly;
- 21—Plate;
- 22—Mount;
- 30—Displacement mechanism;
- 32—Guide;
- 34—Actuator cylinder;
- 36—Air line attachment nipple;
- 38—Piston;
- 41—Cable housing;
- 42—Microswitch;
- 43—Sliding cam;
- 44—Cam guide rod;
- 45—Groove;
- 46—Pulley;
- 47—Linear spring;
- 48—Return spring drum;
- 60—Fin;
- 62—Proximal portion;
- 63—Proximal aft width;
- 64—Fin vertex;
- 66—Distal portion;
- 67—Distal aft width;
- 70—Hull;
- 71—Inner vertical wall;
- 72—Transom;
- 73—Inner edge;
- 75—Engine;
- 80—Steering sensor;
- 82—Tiller arm;
- 84—Inner cable;
- 86—Cable sleeve;
- 88—Fixed cable bracket;
- 89—Attachment means;
- 90—Controller;
- 95—Solenoid; and
- 97—Air tank.

As used herein, the following terms shall apply:

"Inboard tilt" and the like shall refer to a banking turn, wherein the vessel tilts towards the inside of a turn. This is considered to be more comfortable for passengers and is an aim of the invention.

"Outboard tilt" and the like shall refer to a non-banking turn, where the vessel tilts away from the inside of a turn.

"Straight ahead motion" and "forward direction" and the like shall refer to a vessel which is being steered neither left nor right, although it should be understood that factors such as waves and wind may affect the actual direction.

Figure 7:
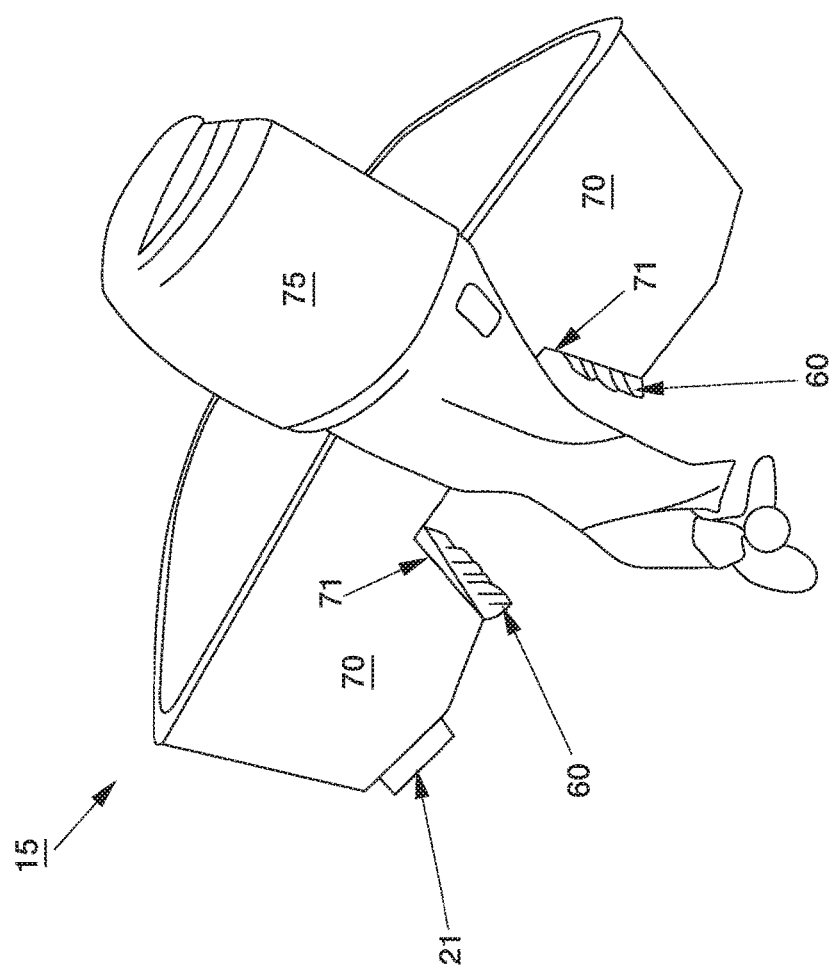
FIG. 7 shows the stern end of a catamaran with fins and the left plate lowered.
Figure 8:
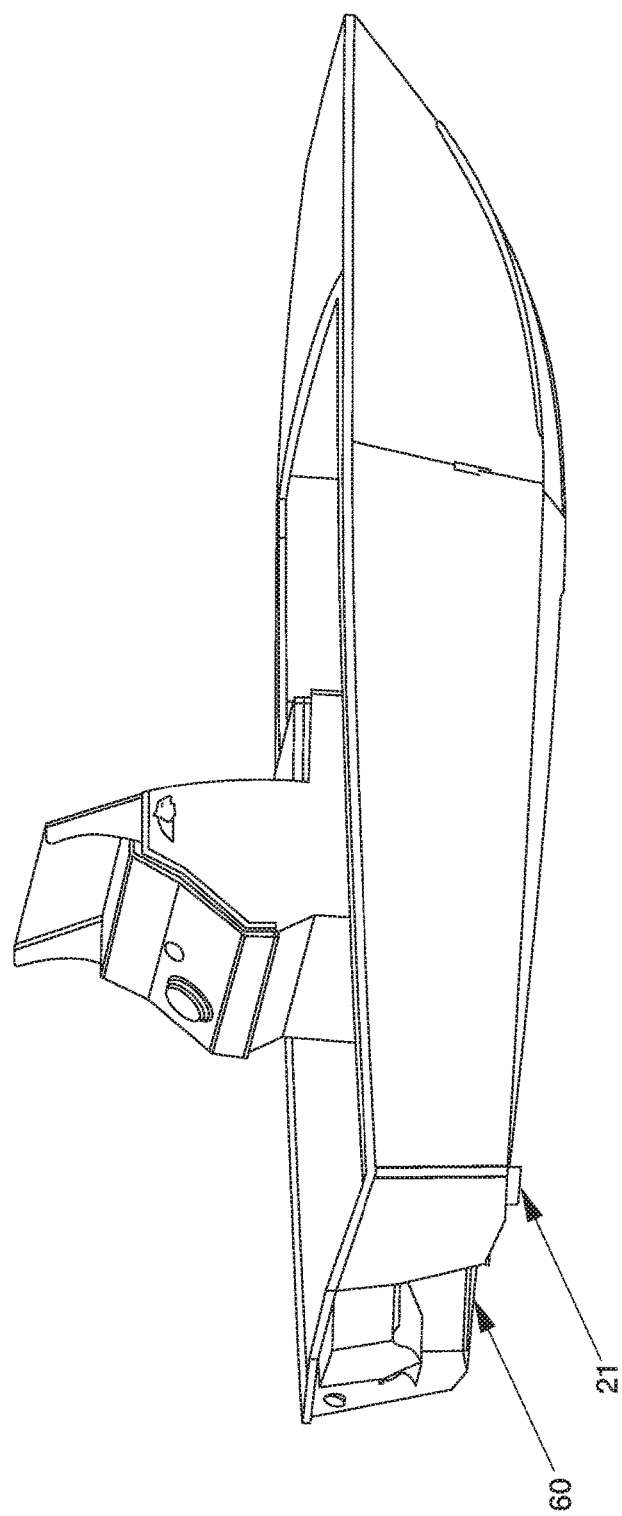
FIG. 8 depicts a catamaran showing the left fin and right lowered plate.

FIG. 7 generally depicts what the present invention would look like to a casual observer. More specifically, water vessel 15 having twin hulls 70, 70 includes a pair of fins 60, 60 mounted on or near inner vertical walls 71, 71; and a pair of plates 21, with only the left plate shown. FIG. 8 also generally depicts a water vessel outfitted with the present invention, except only the right plate is shown, and the left and right fins are partially and totally obscured, respectively.

Figure 11:
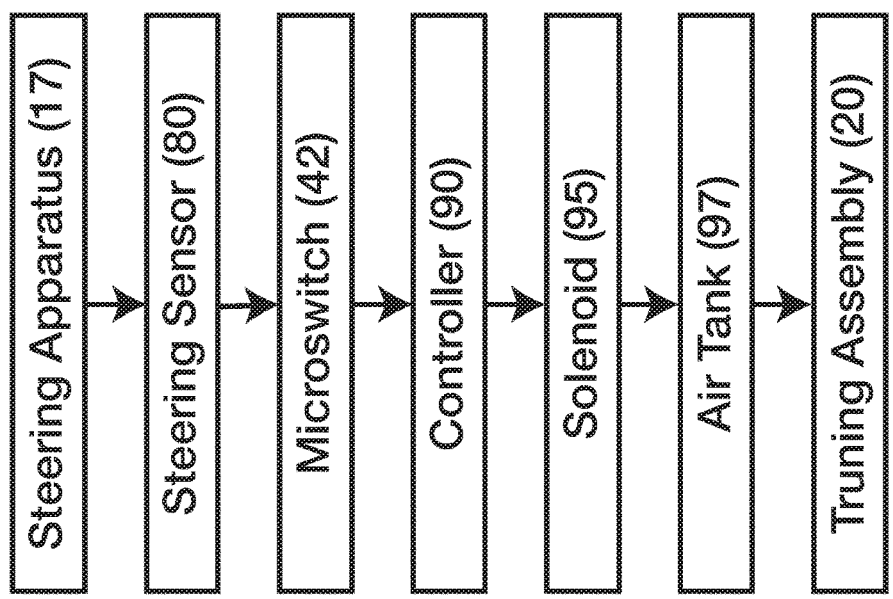
FIG. 11 schematically represents some major components of the present invention.

FIG. 11 schematically represents an overview of the present inventions. Steering apparatus 17 would typically be a steering wheel, but could include other known equipment for turning a vessel such as a tiller or lever. The action of the steering apparatus, for example making a left turn or a right turn, is monitored by steering sensor 80. Microswitch 42 processes steering sensor input, and, if appropriate, signals controller 90. Controller 90 employs solenoid 95 and air tank 97 to cause turning assembly 20 to raise or lower plates as appropriate.

Figure 9:
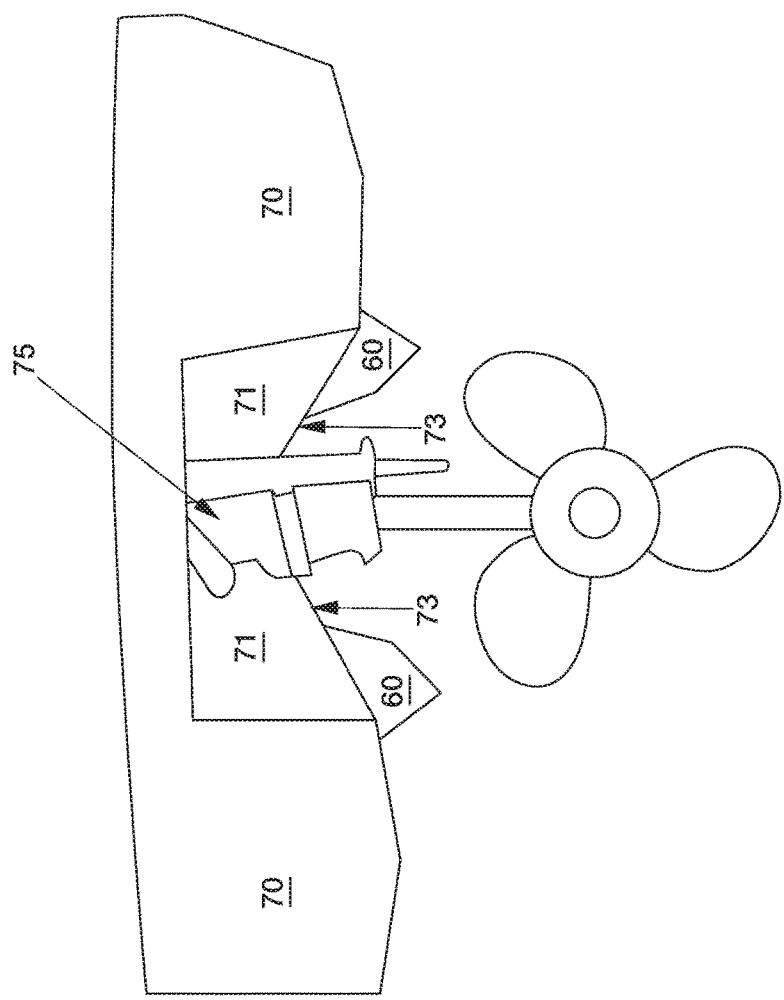
FIG. 9 shows the stern end of a catamaran with fins.
Figure 10:
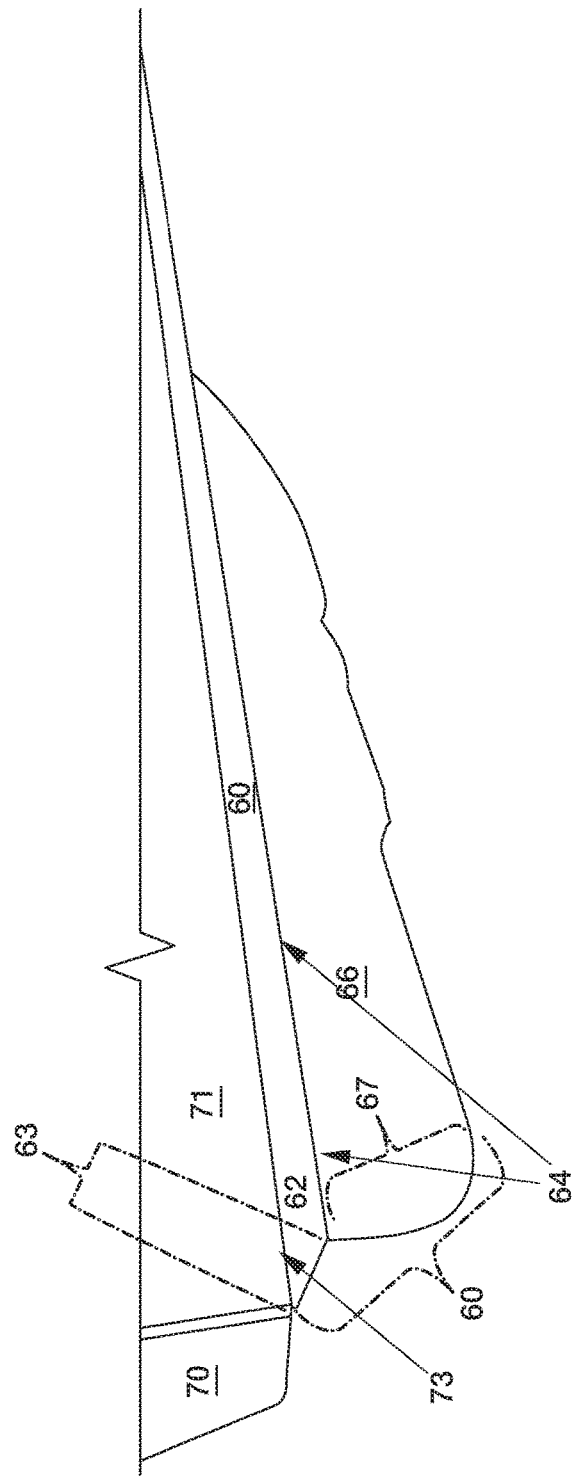
FIG. 10 is a close up of a fin.

Referring to FIGS. 9 and 10, a pair of fins 60, 60 are preferably affixed on or near inner edge 73 of each hull 70, although they could also be affixed on or near inner vertical wall 71. As shown best in FIG. 10, fin 60 preferably includes outwardly projecting proximal portion 62 having proximal aft width 63 at aft end; and downwardly projecting distal portion 66 having distal aft width 67 at aft end; with fin vertex 64 therebetween. Distal aft width 67 is greater than proximal aft width 63. The terminal end of the fin on the stern end of the vessel is preferably approximately 1" to 2" from transom. The optimal position would be dependent on factors such as size of vessel, size and shape of hulls, intended use of vessel, and so forth. Specific dimensions of fins can vary, but are preferably approximately 3' to 4' long, approximately 3" to 5" wide at the widest end, and taper going toward the bow of the vessel. Fins could be constructed out of rigid and water resilient materials such as metals, composites, plastics, and or wood. Fins should not create noteworthy drag in a straight ahead motion, but affect the hydrodynamics during turning. It is preferred that fins 60 project inwardly at between approximately 25 degrees and approximately 60 degrees relative to inner vertical walls 71 of hull 70, with approximately 45 degrees being appropriate for many applications. The specific size, shape, location and angle of the fin will vary according to the specific catamaran, including considerations such as hull design and shape, engine power, and turning radius profile.

Figure 4:
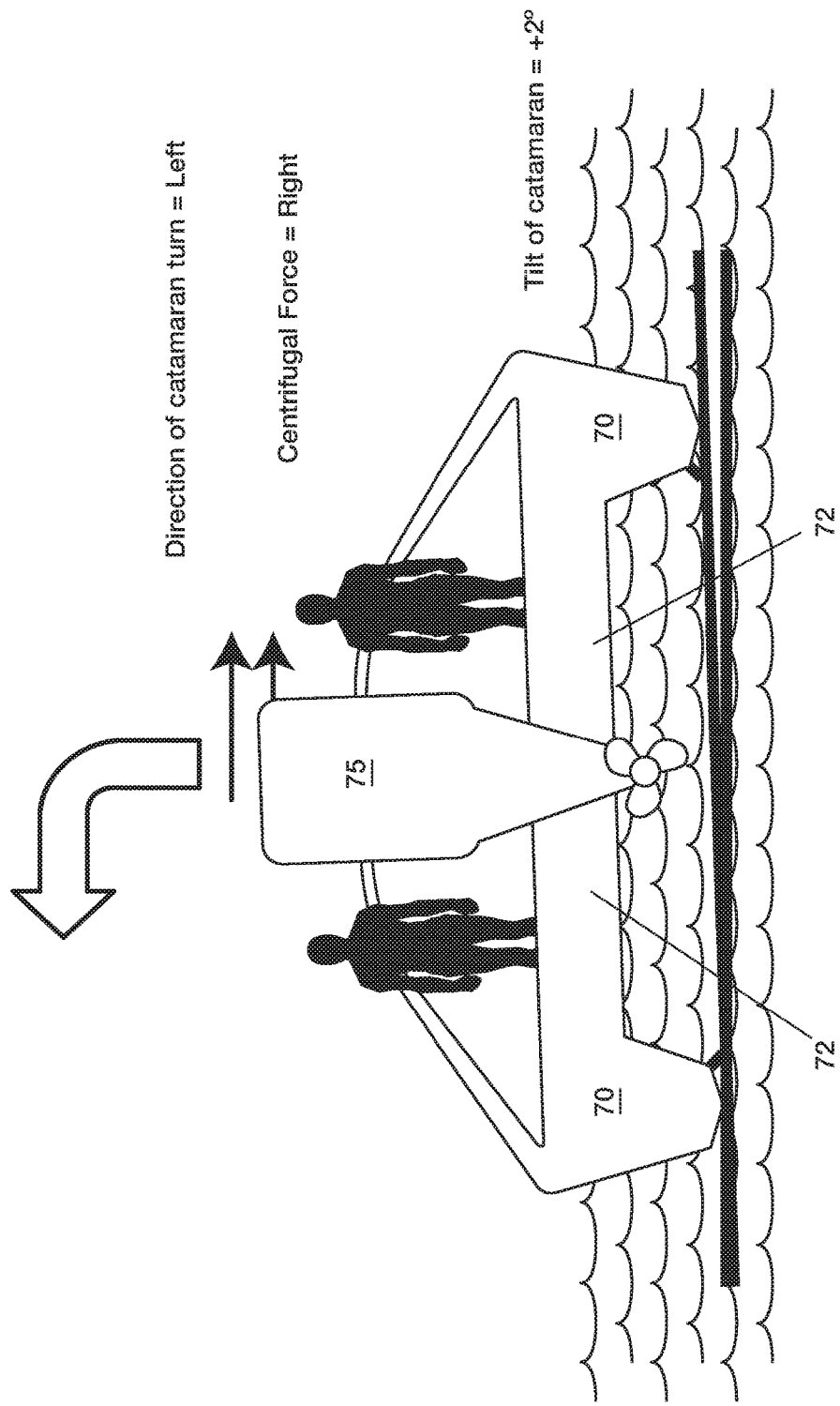
FIG. 4 depicts a catamaran having fins of the present invention that is turning left, and resulting in passengers being forced right but onboard.

In use, when a vessel is turning, the power from an engine or sail introduces lateral energy to the transom from rudder action. This will cause one fin to engage the water and thrust downward the given hull into a turn. Correspondingly, the opposite fin will create lift on the opposite hull. For example, moving the rudder or engine rudder to effect a left turn will shift the bow to the left and shift the transom to the right. As this action occurs, the fin affixed to the left hull will engage creating downward pressure on the left hull while the fin on the right hull will create lift. This results in lowering the left side of the boat deck and lifting the right side of the boat deck. This is depicted in FIG. 4.

As previously discussed, plates 21 are upwardly and downwardly displaceable such that an upwardly (raised) positioned plate does not extend below bottom of hull 70 and therefore does not substantially contact water, but downwardly (lowered) positioned plate 21 extends below bottom of hull 70. Referring to FIG. 7, plate 21 on the left is in lowered position and therefore visible, but plate 21 on the right is not visible because it is in the raised position, within the hull, and therefore would not touch water.

Figure 12:
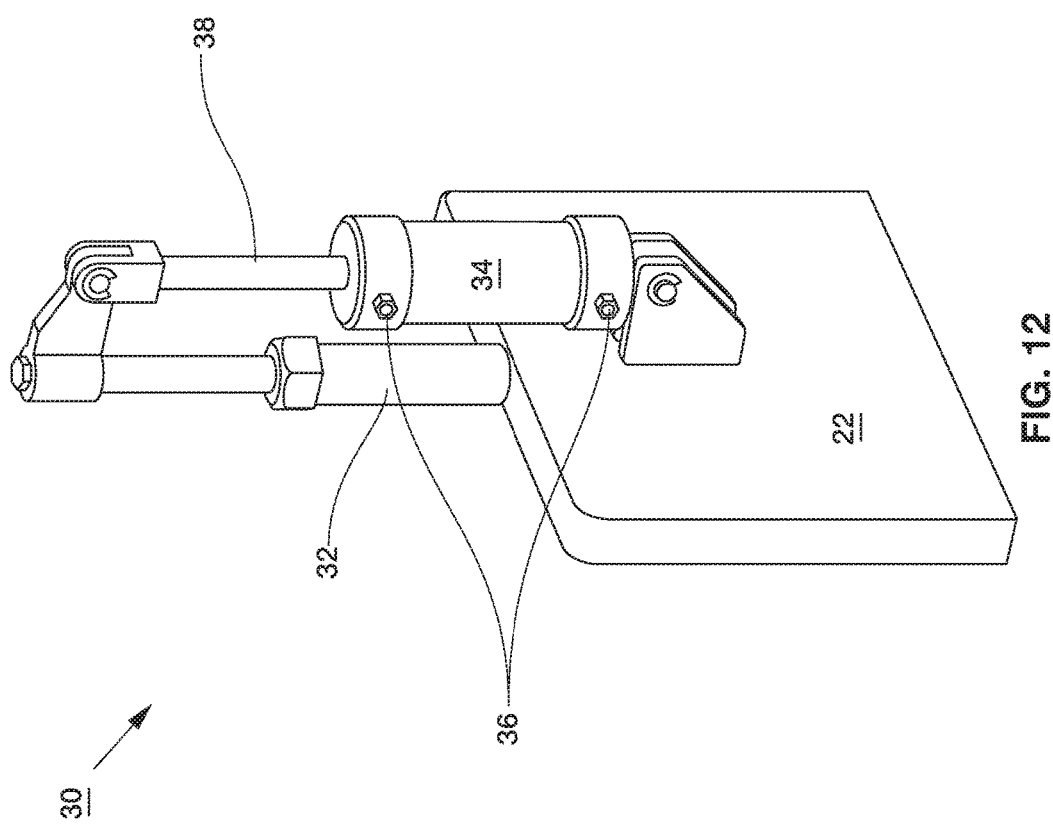
FIG. 12 illustrates a displacement mechanism with the plate in the raised and concealed position within the mount.
Figure 13:
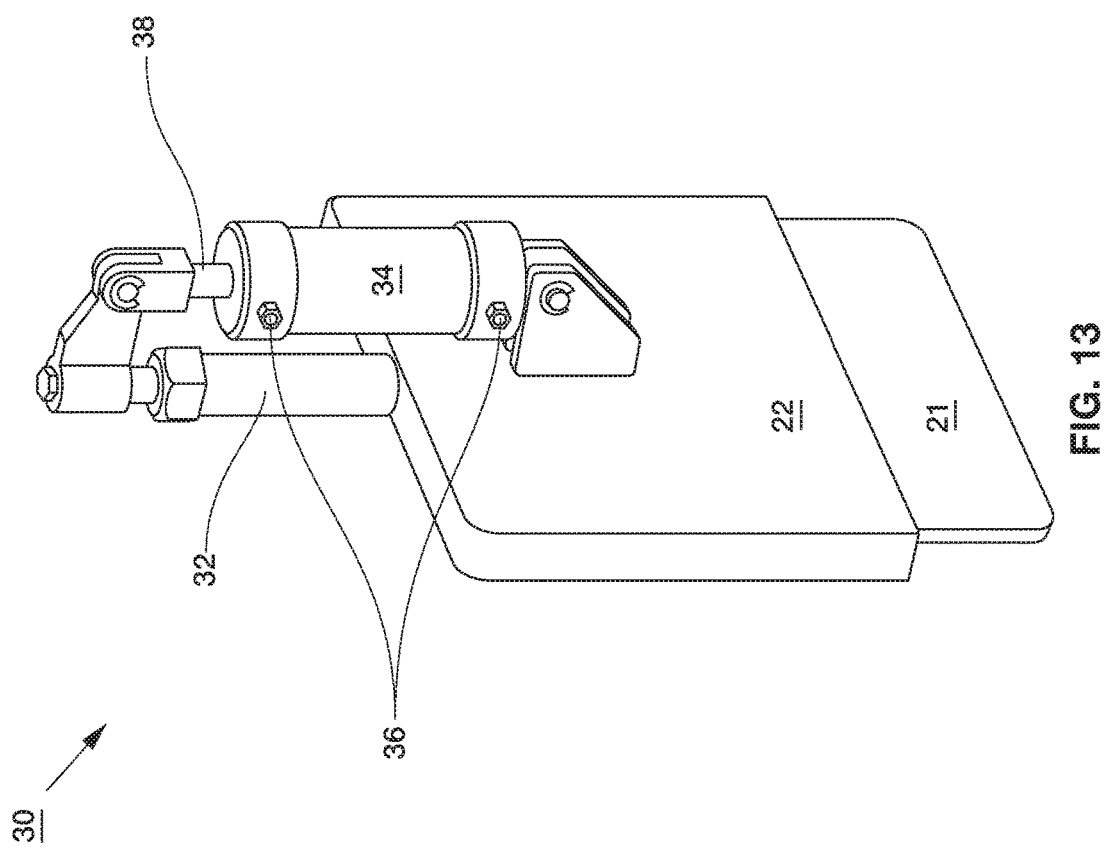
FIG. 13 illustrates a displacement mechanism with the plate in the lowered position and extending outside the mount.

FIG. 12 depicts plate 21 concealed within mount 22 (raised position), while FIG. 13 depicts plate 21 partially protruding from mount 22 (semi-lowered position). The mounts are fixed to the hull, and the plates slide in and out of the mount. Movement is preferably controlled by influx and efflux of air from air tank (not shown) that flows in and out through air line attachment nipples 36. More specifically, the influx of air causes actuator cylinder 34 to travel up piston 38, hereby lifting the plate, and the subsequent efflux of air causes actuator cylinder 34 to travel down piston and lowers the plate. It should be understood that although a pneumatic system is disclosed herein, it is within the scope of the invention to employ hydraulic, electric and/or mechanical actuators as well.

It is preferred that mount 22, and displacement mechanism 30 are positioned on the interior of the hull, with plate 21 extending downwardly upon activation, as disclosed in FIG. 16. However, it is also within the scope of this invention to externally mount these structures, preferably on the transom above the waterline, as disclosed in FIG. 17. Indeed this position may be preferable for retrofitting vessels as it isn't necessary to compromise the integrity of the bottom of the hull.

Figure 5:
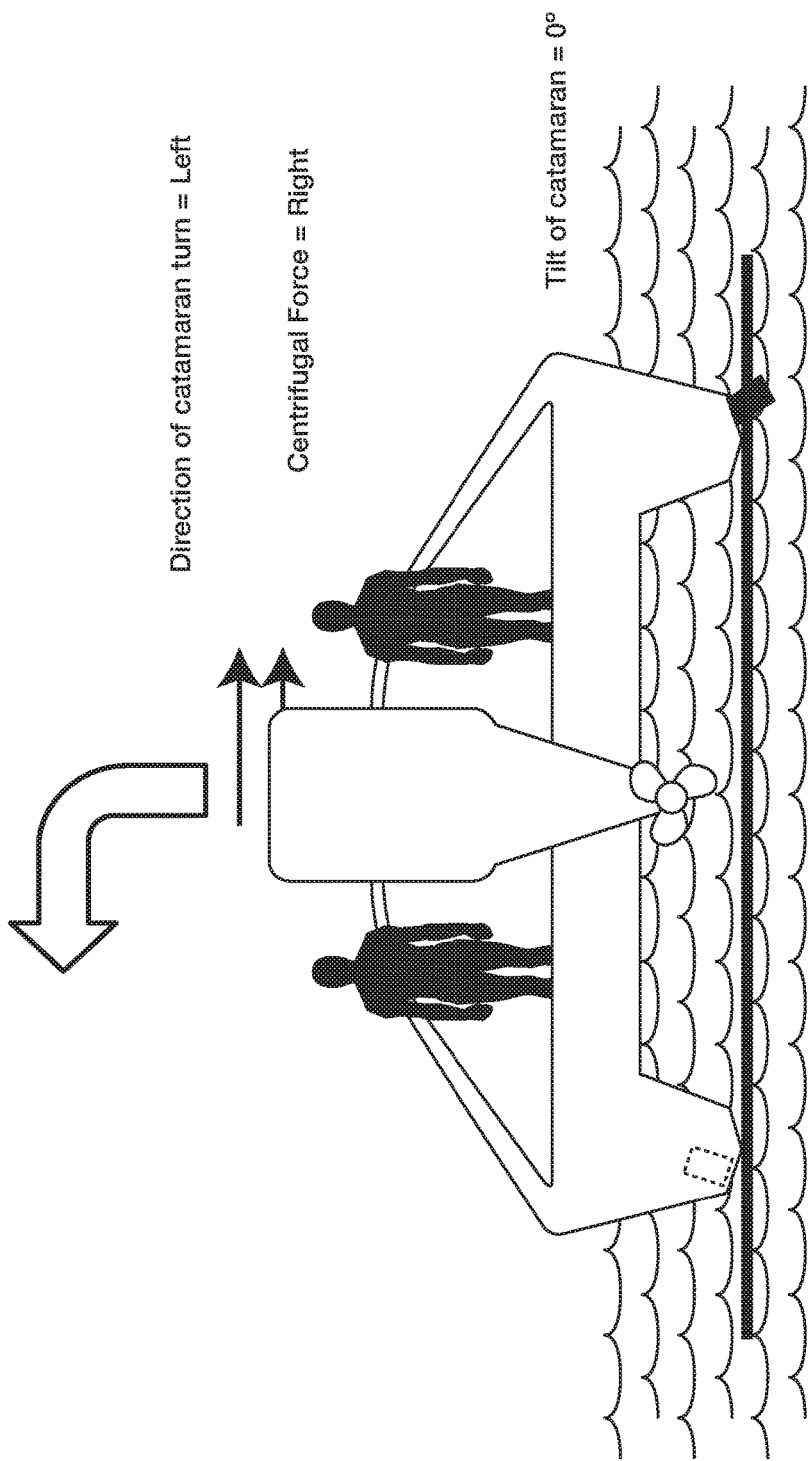
FIG. 5 depicts a catamaran having a lowered right plate of the present invention that is turning left, and resulting in passengers being forced right but not offboard.

In use, upward and downward movement of plate 21 is automatically controlled through the steering system. For example, when the operator steers the catamaran left, the engine prop turns left and the right plate 21 moves downwardly into the water. Downward movement of plate 21 into water creates drag, which creates lift on the side enacted stern while creating pressure down on the diagonal bow. This creates an increasing diagonal lift/pressure across the diagonal hull, which is proportionate to the degree of rudder or engine rudder. This is depicted in FIG. 5.

It is preferred that the downward movement is proportionate to the degree of turn, for example a gentle turn would cause some downward movement of plate into the underlying water, while a sharp turn would fully displace the plate downward into the water. It should be understood that the actual extent of plate displacement depends on the hydrodynamics of the catamaran based on factors such as hull design and shape, engine power, and turning radius profile. Likewise, the optimal physical location of plates 21 will depend on the specific catamaran.

Figure 14:
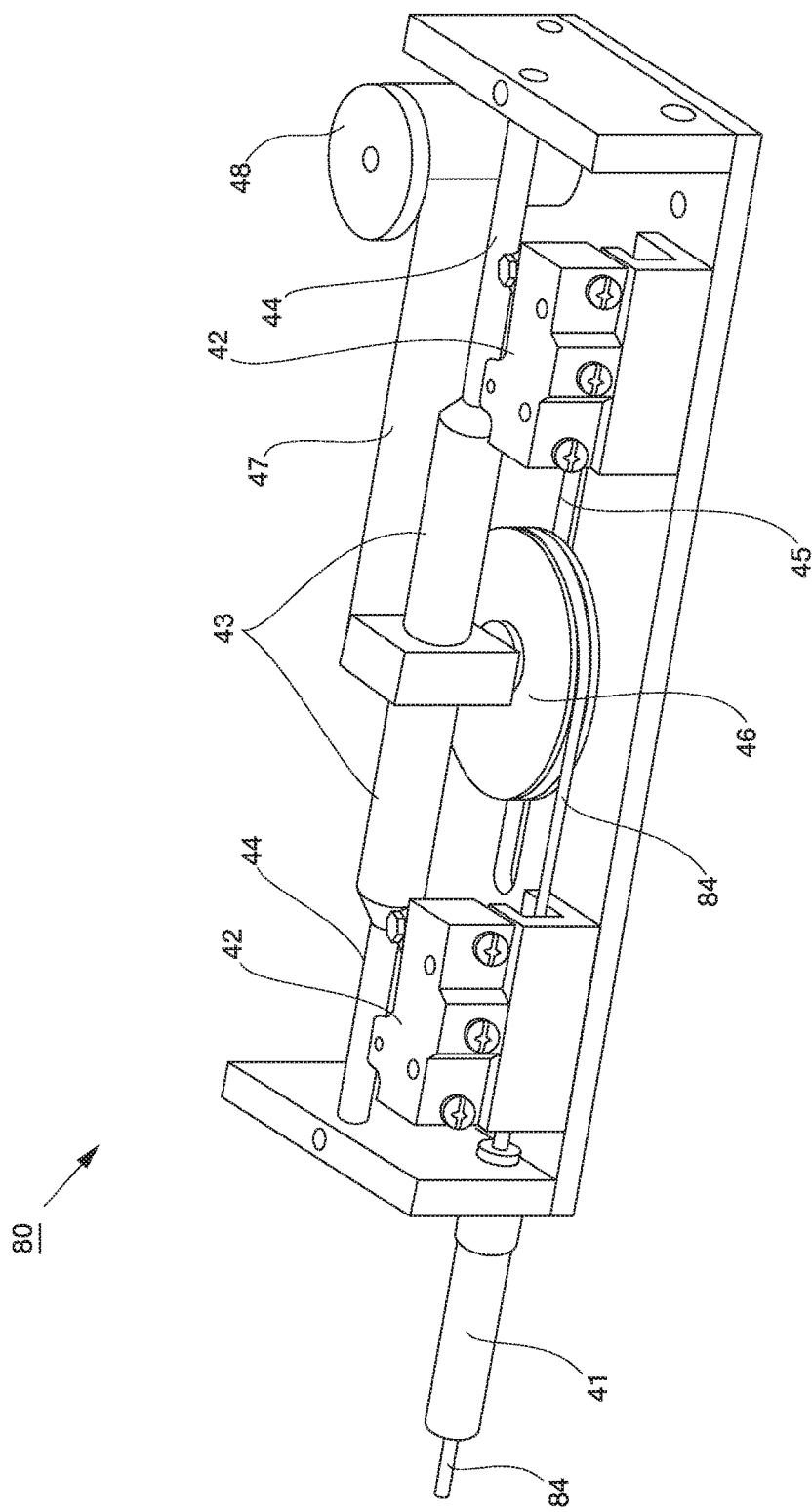
FIG. 14 illustrates some major components of a steering sensor.

The action of the steering apparatus, for example making a left turn or a right turn and the magnitude of those turns, is monitored by steering sensor 80. Referring to FIG. 15, tiller arm of steering apparatus travels in accordance with the direction and magnitude of a turn, which moves inner cable 84. As shown in FIG. 14, slack in inner cable 84 is regulated by pulley 46 which moves along groove 45. Movement of pulley changes position of sliding cam 43 relative to cam guide rod 44. Righting tension on pulley and sliding cam is exerted by linear spring 47 which is housed in return spring drum 48. Positional information of sliding cam 43 is sensed by microswitches 42, which are in communication with solenoid 95 (FIG. 11), air tank 97 (FIG. 11) and ultimately control displacement of plates 21. In this manner the system controls the extent of plate displacement, although some calibration may be required prior to use. It should be understood that although a sensing system employing a cable mechanism is disclosed herein, optical, laser, ultrasonic and/or magnetic position sensing systems could be used as well.

Plates 21, or fins 60, used without the other, modify the lean of a catamaran. Accordingly, each is considered an invention of its own accord. However, the effect of using them together in lean modification system 10 is synergistic insofar as the combination of plates 21 and fins 60 used together is significantly greater than the cumulative effect of using them alone.

Figure 1:
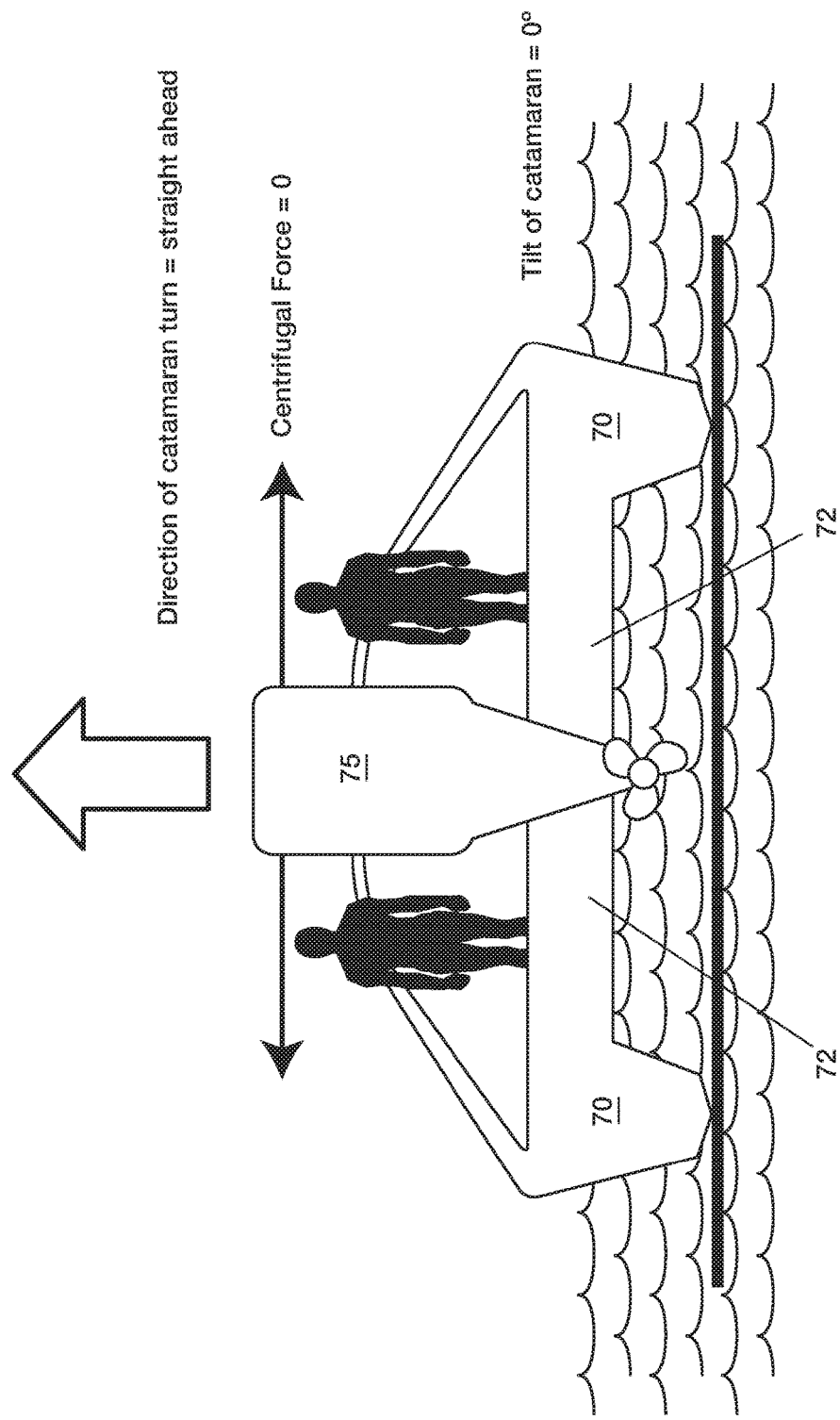
FIG. 1 depicts a catamaran of the prior art which is moving straight ahead.
Figure 2:
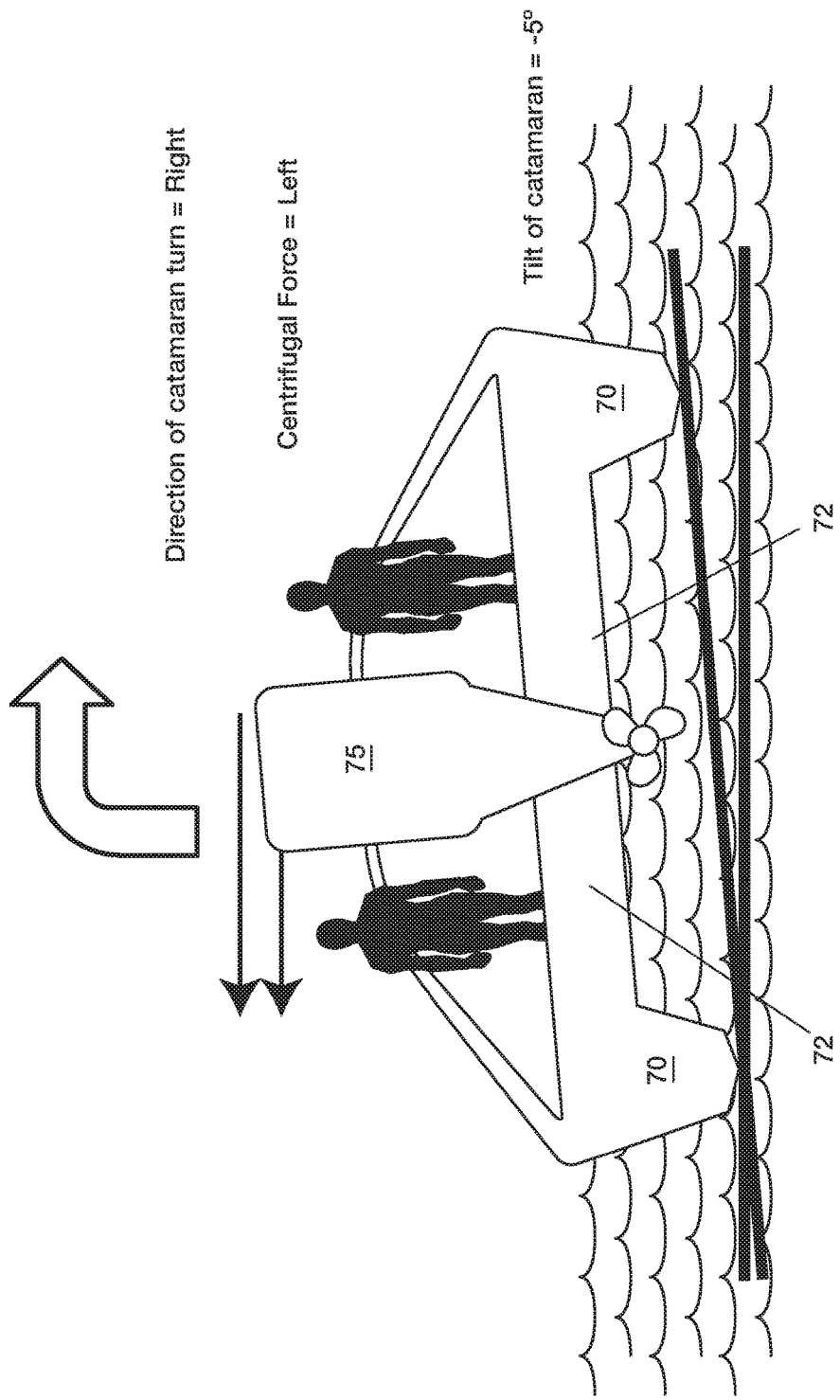
FIG. 2 depicts a catamaran of the prior art turning right, and resulting in passengers being forced left and offboard.
Figure 3:
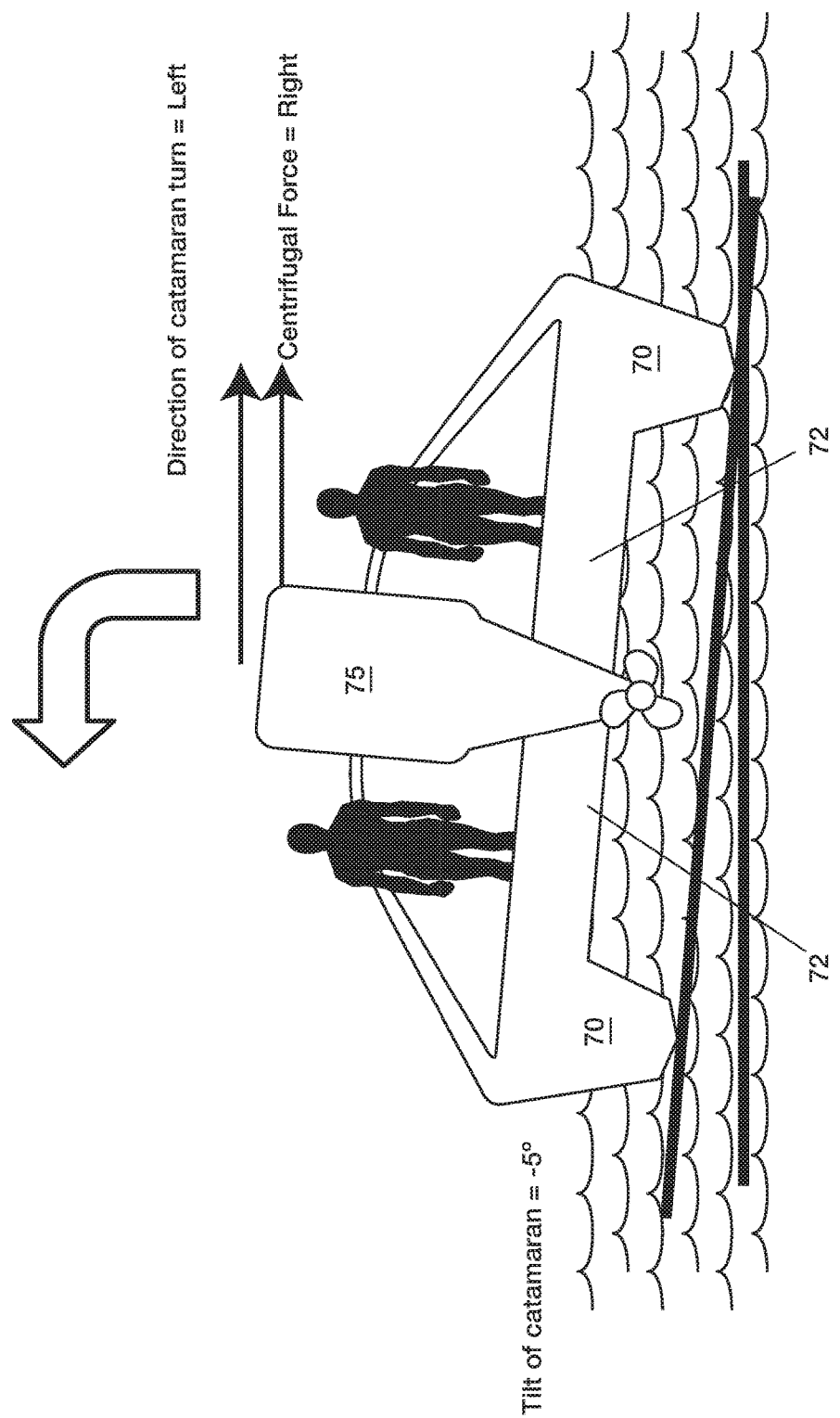
FIG. 3 depicts a catamaran of the prior art turning left, and resulting in passengers being forced right and offboard.
Figure 6:
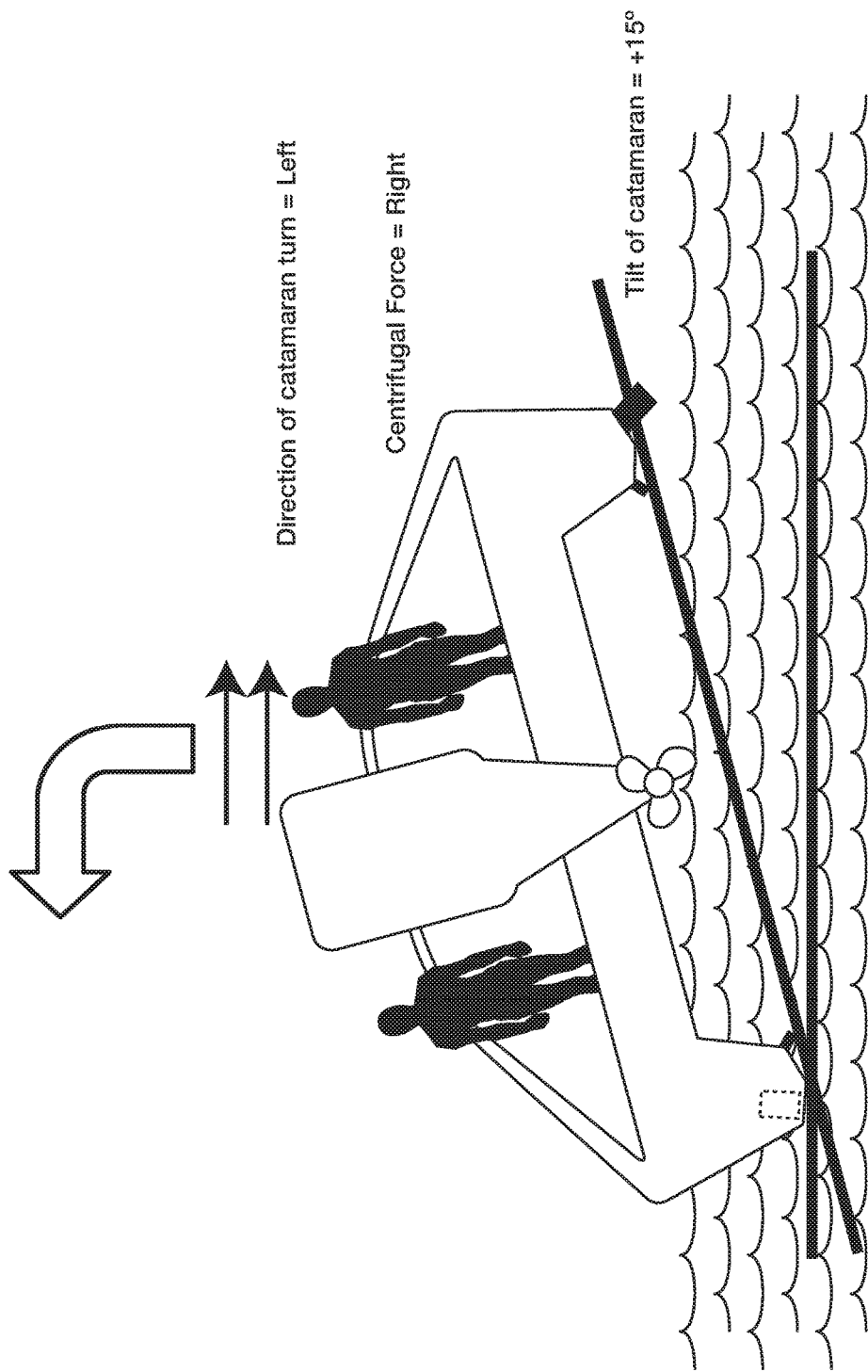
FIG. 6 depicts a catamaran having fins and a lowered right plate of the present invention that is turning left, and resulting in passengers being forced right but onboard.

This synergy was established by measuring the lean of a 2014 22' Cape Fear Catamaran while taking a full turn at approximately 35 mph on the water, where the catamaran was unmodified, with fins 60 only, with plates 21 only, and with both. As set forth in TABLE 1 below, it was found that an unmodified catamaran exhibits an approximately 5 degree outboard tilt. This is shown in FIGS. 2 and 3, and is the negative control. The catamaran with fins only exhibits an inboard tilt of approximately 1 degree, as shown in FIG. 4. This is an improvement of 6 degrees compared to the negative control. The catamaran with plates only exhibits no inboard tilt, as shown in FIG. 5. This is an improvement of 5 degrees compared to the negative control. Remarkably, the catamaran with fins and turning assembly exhibits an inboard tilt of approximately 15 degrees, as shown in FIG. 6. This is an improvement of 20 degrees compared to the negative control.

TABLE 1

| HARDWARE USED | EFFECT ON CENTRIFUGAL FORCE |
|---|---|
| NONE | Outboard 5° |
| Fins only | Inboard 1° |
| Turning assembly only | No Inboard Effect |
| Fins and turning assembly | Inboard 15° (see FIG. 3) |

In depth studies were conducted at 35 mph, but it should be understood that the same dynamics apply to a vessel going slower or faster. More specifically, the effect is proportional to boat speed, such that at higher speeds the boat is level or inclined toward the direction of turn. Below approximately 15 mph the outboard heel in an uncorrected boat is not typically pronounced, so the present invention may not cause much of an effect.

It is hypothesized that this synergy arises because there are two proportional forces at work. As the rudder or engine rudder is increasing degrees of turn, the effect of fins 60 increase proportionately. Simultaneously, the steering system actuates plates 21, which in turn further maximize the effect of fins 60. By way of example, if an operator steers the catamaran right, left plate 21 automatically moves downwardly into the water, the engine prop turns right, the bow goes right and simultaneously the transom gets pushed left (front right-tail left) by action of the engine. Right fin 60 then "digs" in pulling the right half of the boat down while left fin 60 provides lift, thereby raising the left side of the boat. Downwardly extended left plate 21 causes the left rear of the boat to lift and increasing the "dig" of the right fin. This further lowers the right side of the boat, and creates diagonal drag on the front right side. All of these actions combine to create the inward lean into the turn.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. For example, while a motorized twin hull vessel is discussed herein, the technology could also be applicable to sailboats, personal watercraft with two hulls, patio boats, and so forth. Also, while the invention is generally referred to as including the fins and the plates, they could be used individually. It should be understood that all specifications, unless otherwise stated or contrary to common sense, are +/−10%. It should also be understood that ranges of values set forth inherently include those values, as well as all increments between. It should also be understood that "substantially", and the like, should be construed to mean generally true under standard conditions. For example, "substantially permanently affixed" means attached but removable by disengaging fasteners or using brute force.

What is claimed is:

1. A water vessel having a lean modification system including:
   A) A first hull having a first inner wall, wherein said first inner wall is substantially vertical and comprising a first edge at the bottom of said first inner wall;
   B) A second hull having a second inner wall, wherein said second inner wall is substantially vertical and comprising a second edge at the bottom of said second inner wall;
   C) A first fin having a substantially horizontal first proximal portion with an aft end defining a proximal aft width, and a first distal portion with an aft end defining a distal aft width, said distal aft width greater than said proximal aft width, said first proximal portion and said first distal portion separated at a first fin vertex, said first fin fixed on said first edge, said first fin distal portion projecting inwardly at approximately 25° to 60° relative to the plane of the first inner vertical-wall; and
   D) A second fin having a second proximal portion and a second distal portion separated at a second fin vertex, said second fin fixed on or near said second edge, wherein said first and second fins are substantially hydrodynamic when the water vessel is in straight ahead motion.

2. The water vessel of claim 1 wherein said first distal portion is approximately 3' to 4' in length.

3. The water vessel of claim 1 wherein said first distal portion is approximately 3" to 5" wide at its widest, and tapered going toward the bow.

4. The water vessel of claim 1 wherein a full turn at approximately 35 MPH results in no tilt or an inboard tilt.

5. The water vessel of claim 1 further comprising a displacement mechanism including:
   A) A steering apparatus capable of turning the water vessel left and right;
   B) A steering sensor in communication with said steering apparatus;
   C) A first plate movably mounted to said first hull and in communication with said steering sensor, wherein said first plate vertically displaces relative to said first hull at a distance determined by the position of said steering apparatus.

6. The water vessel of claim 5 further comprising a second plate movably mounted to said second hull and in communication with said steering sensor, wherein said second plate vertically displaces relative to said second hull at a distance determined by the position of said steering apparatus.

7. The water vessel of claim 6 wherein first plate and said second plate vertically displace in opposition.

8. The water vessel of claim 5 wherein a full turn at approximately 35 MPH results in an inboard tilt.

* * * * *